March 18, 1969   L. M. BRADY ET AL   3,433,100
PLANETARY GEARING
Filed Sept. 26, 1967
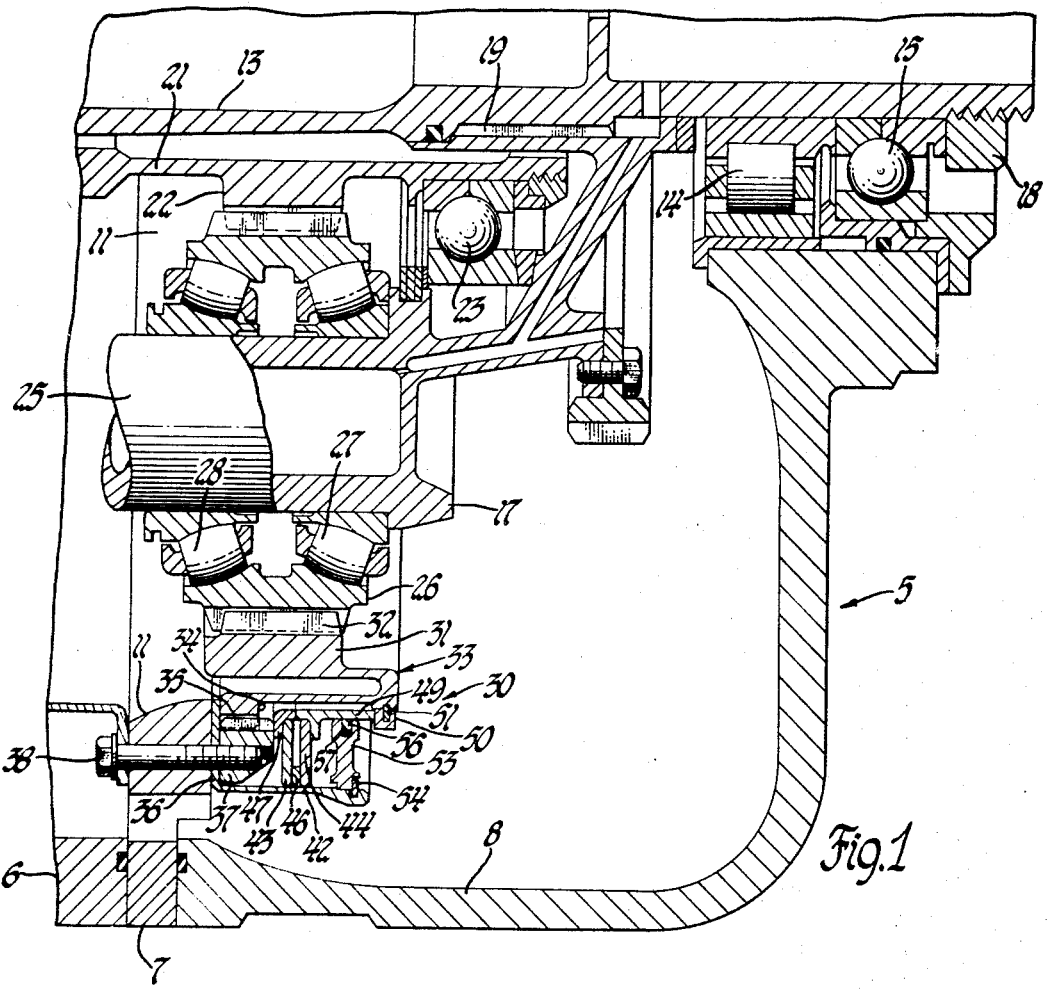
Fig.1
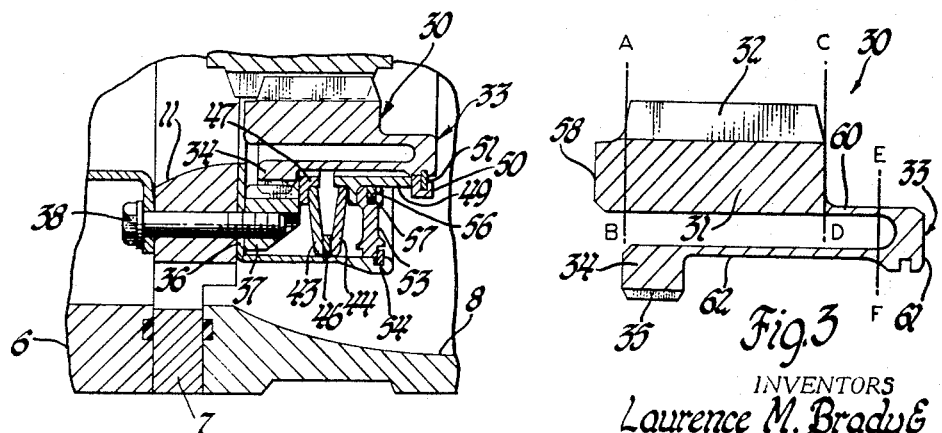
Fig.2
Fig.3
INVENTORS
Laurence M. Brady &
Milton F. Lindgren
Paul Fitzpatrick
ATTORNEY United States Patent Office 3,433,100
Patented Mar. 18, 1969

3,433,100
PLANETARY GEARING
Laurence M. Brady and Milton F. Lindgren, Indianapolis, Ind., assignors to General Motors Corporation, Detroit, Mich., a corporation of Delaware
Filed Sept. 26, 1967, Ser. No. 670,557
U.S. Cl. 74—801    8 Claims
Int. Cl. F16h 1/28

ABSTRACT OF THE DISCLOSURE

A planetary gear system includes a nonrotating ring gear cooperating with a number of planet gears mounted on a rotating carrier. The ring gear is mounted on helical splines so that it can shift axially in response to variations in torque. The ring gear is connected to these splines by an axially extending rebent web so proportioned that radial deflection of the ring gear caused by the radial component of torque of the planet gears is not communicated to the splines which are at the other margin of the recurved flange from the ring gear. Also, springs which bias the ring gear axially are isolated from the ring gear.

---

Our invention relates generally to planetary gearing and specifically to aircraft turboprop reduction gears of the type described in United States patent applications of Cyril M. Hawkins and Truman R. Richardson, Ser. Nos. 579,598 and 519,608 for Torque Responsive Device and Reduction Gear, respectively, both filed Sept. 15, 1966, of common ownership with this application. The prior applications describe a planetary reduction gear including a nonrotating ring gear mounted on axial splines and biased by springs so that the ring gear may shift in response to changes in torque level to effect control functions.

Our present invention relates particularly to the supporting arrangement for a ring gear connecting it to a fixed structure, such as a gear case, and involves the provision of an axially extending web having the ring gear at one edge and the splines at the other edge, and having the proportions of the web such that the radial deflections of the gear due to the radial forces exerted on it by the planet gears are not transmitted to the mounting splines. The mounting web is recurved so as to extend from the gear in one direction, then return in the opposite axial direction to the support. The desired result can be attained with quite compact structure by using the recurved web. In addition, the basic mounting structure for the ring gear on the gear box is strengthened and the spring arrangement for biasing the gear axially is improved.

The purpose and result of these improvements is to reduce misalignment and wear of the parts and thus to prolong the service life of a reduction gear and to fit it for operation at higher loads. While the invention is intended for use in the reduction gear described in the applications referred to above, it is suitable for use in various gear installations, particularly those where high performance is important.

The principal objects of our invention are to improve the strength and endurance of gearing embodying ring gears, to provide improved high-performance planetary gears, to provide improved means for supporting a highly stressed ring gear, to provide a support for a ring gear which is significantly deflected by planet gear loads in operation, which support absorbs the deflections and isolates them from the ring gear mounting structure, and to provide a ring gear mounting structure allowing radial distortion of a ring gear to conform to the loads imposed by a plural number of planet gears.

Further objects are to improve an axially slidable spline mount for a ring gear and to reduce wear and friction in the splines. Still further objects are to improve an arrangement of caged biasing springs for an axially slidable ring gear and to eliminate direct contact between the ring gear and springs.

The nature of the invention and its advantages will be clear to those skilled in the art from the succeeding detailed description of the preferred embodiment of the invention and the accompanying drawings thereof.

FIGURE 1 is a partial sectional view of a turboprop engine reduction gear taken on a plane containing the axis of the planetary gearing.

FIGURE 2 is a view of a portion of FIGURE 1 illustrating the axial shifting of the ring gear at low torque.

FIGURE 3 is a cross-sectional diagram of the ring gear.

Some of the considerations involved in the design and development of reduction gears for aircraft power plants and some references to prior art gearing may be found in the prior applications referred to above. Also, the general organization of the reduction gear and torque responsive device, of which our present invention is an improvement, may be ascertained more fully by reference to those applications if it should be necessary; however, we believe the subsequent description of the improved ring gear arrangement is sufficient to understand the present invention without reference to the prior applications.

Referring to FIGURE 1, the reduction gear comprises a roughly cylindrical case 5 comprising a front housing 6, a center plate 7, and a rear housing 8. The front and rear housings are preferably cast from a high strength magnesium alloy, such as AMS–4418. They are fixed together and to the center plate by bolts and dowels (not illustrated). The center plate, which provides a support for the ring gear to be described, is also made of magnesium alloy. The center plate 7 is a plate the margins of which extend around the perimeter of the reduction gear box and which extends inwardly to a rigid integral ring 11 which is of greater thickness than the web of plate 7.

A propeller shaft 13 is mounted rotatably in the case 5 by bearings including a roller bearing 14 and a ball thrust bearing 15. These bearings are retained between the hub of a planet carrier 17 piloted on the propeller shaft 13 and a nut 18 at the rear end of the propeller shaft. The planet carrier is coupled to the propeller shaft by splines 19. The power input is provided by a shaft 21 coaxial with the propeller shaft and planet carrier, which has integral with it a sun gear 22. Shaft 21 is supported within the planet carrier by a ball bearing 23. The forward bearings for the sun gear shaft and propeller shaft may be as illustrated in the prior applications and are not illustrated here. The planet carrier 17 includes seven hollow trunnions 25, on each of which is mounted a planet gear 26. The planet gears are supported on the trunnions by rolling contact bearings 27 and 28. These are opposed tapered barrel roller bearings particularly adapted to accept the overturning moment (moment about an axis normal to the planet gear axis) resulting from the use of helical gears.

The planet gears 26 mesh with the sun gear 22 and with a one-piece ring gear 30. The ring gear includes a ring 31 with teeth 32 which constitutes a gear and a recurved continuous web 33 by which the gear is supported. Web 33 terminates in an outwardly projecting flange 34 into which are cut helical axially extending spline teeth 35. The forward edge of flange 33 bears against a wear ring 36 mounted on the rigid support ring 11 and the spline teeth 35 engage with internal splines in a supporting annulus or gear retainer 37. The wear ring 36 and retainer 37 are fixed to the support ring 11 by a circle of bolts 38.

The wear ring 36 includes a rearward cylinder 42, which serves as a cage and guide for Belleville springs 43 and 44, which are shown in their loaded condition in FIGURE 1 and relatively relaxed in FIGURE 2. The outer margins of the Belleville springs are guided by the cage 42 and are separated by a ring 46 slidable within the cage 42. The inner margin of spring 43 bears against a reciprocable L-section ring 47 which normally bears against the retainer 37 but may engage the rear face of flange 34 of ring gear 30. The inner margin of spring 44 bears against an outwardly extending flange on a reciprocable ring 49 which may bear against ring 47 and which bears against a removable abutment ring 50 fixed to the ring gear 30 by circumferentially extending quarter-circular keys 51. Ring 49 is slidable axially on an annular spring stop 53 fixed to the rear margin of cage 42 by quarter-circular keys 54. A split ring 56 of the piston ring type mounted in a groove in stop 53 provides a clearance-tolerant pilot for ring 49. Pilot ring 56 is biased outwardly by an expander 57 such as a wave spring.

The Belleville springs 43 and 44, acting in conjunction with the rings 47 and 49 and the spring stop 53 bias the ring gear 30 axially toward the position shown in FIGURE 2. In this position, ring 47 bears against retainer 37 and against flange 34 of the ring gear, and the flange of slidable ring 49 bears against supporting ring 53. The ring gear is thus impositively but definitely located. The normal operating torque on the ring gear, as a result of helical teeth on the bearing itself or a helical pitch of splines 35, or both, generates an axial thrust which moves the ring gear forward against the Belleville springs until the ring gear abuts the wear ring 36. In the event of reverse or negative torque on the planetary gearing, the ring gear can slide further rearwardly from the position shown in FIGURE 2, slidable ring 49 remaining in the position illustrated in FIGURE 2 and ring 47 moving rearwardly to abut ring 49. Thus spring stop 53 limits the rearward movement of the ring gear. This movement of the ring gear to the three axial locations serves, as explained fully in application Serial No. 579,598 referred to above, to actuate a push rod arrangement which may serve as a means for control of the turboprop power plant as described in United States Patent No. 2,959,228.

Returning now to the structure of the ring gear and particularly of the supporting web 33, which is the central point of our invention, it is so constituted that the deflections of the ring gear are not transferred to flange 34 or controlled by the heavy, rigid support 11. There is no significant radial movement of flange 34 against wear ring 36 or in the splines between the ring gear and the supporting gear retainer 37. Also, the structure is such that the ring gear 31 maintains its cylindrical form and does not become conical or tapered as a result of the load.

An understanding of the principles of the structure of the ring gear may be assisted by reference to FIGURE 3 in which the ring gear 30 is illustrated in cross-section and is indicated as consisting of five portions, all of which are part of one integral annular structure. There is the ring gear portion 31 between lines A–B and C–D bearing the gear teeth 32. There is an overhang or ring gear extension 58 to the left of line A–B. There is a portion 60 of the web 33 between lines C–D and E–F, which may be called a band. There is the return bend portion 61 of the web to the right of line E–F, and there is the forwardly extending portion or band 62 of the web to the left of line E–F which terminates in the flange 34 bearing splines 35. The foregoing differentiation of the parts of the ring gear is sufficient to explain the principles outlining the invention. In the succeeding discussion, radial movement of an element of structure will be called "expansion" (plus or minus) and departure from parallelism to the axis, or coning, will be called "tilt." The force exerted by the planet gears on the ring gear has a radial component which causes an outward expansion of the ring gear at each planet gear, and a corresponding inward or negative expansion between the planet gears. This expansion is transmitted to band 60, exerting a force which acts to distort this section from its normal cylindrical form, both by expansion and by tilt. This action is transmitted from band 60 to the recurved portion 61, tending to deflect it locally in a radial direction and tending to increase and decrease locally the normal 180° curvature of section 61; or, in other words, to spread bands 60 and 62 apart or press them toward each other. The expansions and tilts at the connection between portions 61 and 62 then cause deformations of the portion 62. If the overall effect is such that the expansion of band 62 at E–F is equal and opposite to the effect of the tilt of band 62 from E–F to its forward edge, the forward edge is unaffected by expansion of the ring gear. A structure of this sort may be analyzed by known principles of stress analysis to proportion the parts so that they will carry the loads safely and also so that the summation of the radial component of movement of flange 34 following the radial movement of the ring gear 31 at the same point on the circumference is balanced by a component of distortion in the opposite direction due to the tilt of the parts; that is, their relative deformation in a plane containing the axis of the ring gear. This serves to eliminate rubbing and wear between flange 34 and its supports with the sort of mount illustrated in the drawings.

It should be understood, however, that our mount is of value altogether apart from any sliding or splined mounting of the ring gear. For example, so far as the planetary gear action is concerned, the flange 34 could be bolted solidly to the rigid support ring 11. The fact that the flange 34 does not follow the deflections of the ring gear has the consequence that the ring gear can deflect without interference from such a solid connection to the support 11. Thus, the ring gear is adequately supported but is free to flex elastically to accommodate to the forces exerted by the planet gears. In other words, the ring 11 does not stiffen the ring gear 31 so far as radial deflection is concerned.

The radial deflection of the ring gear is a natural consequence of the light weight, highly stressed structure. However, it has an advantage in that the flexure of the ring gear accommodates the minor variations in contact between the several planet gears and the ring gear resulting from the necessary lack of absolute accuracy of the planet gear axis locations and tolerances in other parts of the structure. Thus, it is desirable that the ring gear mount not rigidize the ring gear.

Mention should be made of the forward extension 58 of the ring gear beyond the effective toothed portion, to the left of line A–B. This is provided to cause the ring gear to have equal effective stiffness at each edge. In other words, since the portions 60, 61 and 62 resist radial deflection of the rear margin of the ring gear, it would tend to tilt as well as move radially. By providing the extra section 58, the forward edge is made equally rigid with the rear edge. If desired, the additional stiffness at the forward edge could be otherwise provided as, for example, by having the base portion 31 of the ring gear increase in thickness toward the forward edge.

It will be seen from the foregoing that our invention provides important improvements in planetary gearing, particularly in the means connecting the ring gear to the gear case and also in the arrangement by which the springs which bias the ring gear axially are coupled to the ring gear but are isolated from direct contact with it.

The detailed description of the preferred embodiment of our invention for the purpose of explaining the principles thereof must not be considered as limiting or restricting the invention, since many modifications may be made by the exercise of skill in the art without departing from the principles thereof.

We claim:

1. Planetary gearing comprising, in combination, a gear case including structure defining rigid supporting means, a ring gear nonrotatably mounted on the supporting means, a sun gear rotatably mounted in the case, a planet carrier rotatably mounted in the case, a plural number of planet gears rotatably mounted on the carrier meshing with the sun gear and the ring gear, and an elastic web having one edge rigid with the ring gear and the other edge coupled to the supporting means so as to support and locate the ring gear, characterized by the conditions that the web is of a rebent annular configuration comprising two concentric annular bands and an annular return bend joining the bands and the deflection characteristics of the web are such that radial deflections of the ring gear are substantially isolated from the said other edge of the web.

2. Gearing as defined by claim 1 including also a splined connection between the web and the supporting means.

3. Gearing as defined by claim 1 including also a connection between the web and the supporting means of a character translatable axially of the ring gear.

4. Gearing as defined by claim 3 including also spring means effective to bias the ring gear axially.

5. Gearing as defined by claim 4 in which the spring means comprises opposed Belleville springs coaxial with the ring gear.

6. Gearing as defined by claim 5 including also a first ring having one face engaging a said spring and a second ring engaging the other said spring, the rings being disposed to hold the springs out of contact with the ring gear and to transmit thrust from the springs to the ring gear.

7. Planetary gearing comprising, in combination, a gear case including structure defining rigid supporting means, a ring gear nonrotatably mounted on the supporting means, a sun gear rotatably mounted in the case, a planet carrier rotatably mounted in the case, a plural number of planet gears rotatably mounted on the carrier meshing with the sun gear and the ring gear, means mounting the ring gear for translation axially of the ring gear, two opposed oppositely coned Belleville springs encircling the ring gear having inner opposed faces and outer faces, and two axially movable rings disposed between the springs and ring gear, one ring engaging the outer face of each spring, the rings being mutually engagable to limit deflection of the springs, each ring being engageable with the supporting means and with the ring gear.

8. Gearing as defined by claim 7 in which the rings include means disposed between the springs and the ring gear to prevent contact of the springs with the ring gear.

References Cited

UNITED STATES PATENTS

| 2,700,311 | 1/1955 | Bade | 74—801 X |
| 2,825,247 | 3/1958 | Haworth et al. | 74—801 |
| 2,883,885 | 4/1959 | Upton | 74—801 |
| 2,936,655 | 5/1960 | Peterson et al. | 74—801 |

FOREIGN PATENTS 682,275  9/1939  Germany.

ARTHUR T. McKEON, *Primary Examiner.*